(12) United States Patent
Stretton (10) Patent No.: US 7,770,292 B2
(45) Date of Patent: Aug. 10, 2010

(54) ENGINE CORE STAND ARRANGEMENT AND METHOD OF REMOVAL AND TRANSPORTATION OF AN ENGINE CORE

(75) Inventor: Richard G. Stretton, Loughborough (GB)

(73) Assignee: Rolls-Royce PLC, London (GB)

( * ) Notice: Subject to any disclaimer, the term of this patent is extended or adjusted under 35 U.S.C. 154(b) by 568 days.

(21) Appl. No.: 11/812,065

(22) Filed: Jun. 14, 2007

(65) Prior Publication Data
US 2008/0011932 A1 Jan. 17, 2008

(30) Foreign Application Priority Data
Jul. 13, 2006 (GB) .................. 0613929.9

(51) Int. Cl.
*B23Q 7/00* (2006.01)
(52) U.S. Cl. .................. 29/889.1; 29/281.1; 29/281.4; 29/281.6; 29/559; 269/17; 269/91
(58) Field of Classification Search ................ 29/281.1, 29/281.4, 281.6, 559, 889.1, 882, 824; 269/17, 269/91
See application file for complete search history.

(56) References Cited

U.S. PATENT DOCUMENTS

| | | | |
|---|---|---|---|
| 3,432,911 A * | 3/1969 | Rodgers ................ | 29/464 |
| 4,440,265 A | 4/1984 | Spagnoli | |
| 4,660,796 A | 4/1987 | Garrec | |
| 4,699,337 A | 10/1987 | Lewis | |
| 5,383,652 A | 1/1995 | Van Den Berg | |
| 5,653,351 A * | 8/1997 | Grout et al. ................ | 212/315 |
| 5,816,367 A * | 10/1998 | Lilja et al. ................ | 187/244 |
| 5,860,275 A | 1/1999 | Newton et al. | |
| 5,870,824 A | 2/1999 | Lilja et al. | |
| 6,170,141 B1 | 1/2001 | Rossway et al. | |
| 6,292,999 B1 * | 9/2001 | Rossway et al. ............. | 29/559 |
| 6,298,536 B1 * | 10/2001 | Rossway et al. ........... | 29/281.1 |

FOREIGN PATENT DOCUMENTS

| | | |
|---|---|---|
| DE | 102 16 258 A1 | 4/2003 |
| GB | 2 394 940 A | 5/2004 |
| WO | WO 97/19850 | 6/1997 |

* cited by examiner

*Primary Examiner*—David P Bryant
*Assistant Examiner*—Christopher Besler
(74) *Attorney, Agent, or Firm*—Oliff & Berridge, PLC (57) ABSTRACT

Transportation of larger diameter gas turbine engines can be problematic. In such circumstances it is known to separate the fan assembly (30) from the engine core (1) and other parts to facilitate transportation. Separation of the fan assembly (30) and engine core (1) can require a gantry which adds to inconvenience and costs. By utilizing a platform (2, 44) with suspender members (43) in the form of boot straps (43) which extend down from an existing pylon (31) it is possible to remove an engine core (1) through a carriage dolly (3, 45) which moves along a rail (21 within the platform (2, 44) generally laterally until it is possible to lower the engine upon the platform to ground level. The platform (2, 44) and carriage dolly (3, 45) can then act as a stand for transportation of the engine core.

16 Claims, 9 Drawing Sheets

ENGINE CORE STAND ARRANGEMENT AND METHOD OF REMOVAL AND TRANSPORTATION OF AN ENGINE CORE

The present invention relates to arrangements and methods for removing engine cores from gas turbine engines to facilitate transportation.

It will be understood that for maintenance, installation and refurbishment it is necessary to transport gas turbine engines. It will also be understood that as fan diameters become larger in order to improve operational efficiency and performance it is necessary to use specialist air freight transport aircraft to move such large diameter gas turbine engines. In such circumstances, increasingly it is desirable to separate the fan and core modules as necessary to allow transportation of larger fan diameter engines as more standard air or road freight. It will also be understood shipping only a replacement core for a gas turbine engine rather than a complete replacement engine will save costs in comparison with holding and transporting a complete spare engine. Finally, it will also be understood that the ability to replace an engine core on wing will save time compared to removing the complete engine and swapping out a replacement core in that removed engine. It is known to provide engine core removal on wing and one method of achieving such removal is described in U.S. Pat. No. 5,860,275. It is also known to remove engines using ground support equipment. Clearly, it is known to provide transportation stands which will allow a fan and core module to be transported together but only once the engine is removed from its wing location.

In view of the above, it will be appreciated that prior art engine core stands and methods of removing engines required the engine core to be shipped on a dedicated transportation stand with a large overhead gantry shipped separately for loading and re-assembly etc. The large overhead gantry was utilised to lift and attach the engine to the aircraft structure. Furthermore, additional features of the engine such as the nacelle reverser may need to be removed to allow rails for removal of the engine to be fitted and it may be difficult to provide a rail for the gantry to match the required withdrawal direction, that is to say to suit all installation attitudes including roll/dihedral, nose up and toe in attitudes.

In accordance with aspects of the present invention there is provided an engine core removal frame arrangement for a gas turbine engine, the arrangement comprising a platform with a conveyor path for a dolly carrier to carry an engine core in use and suspender members for securing the platform to an engine pylon in use. The arrangement characterised in that the suspender members have spaced mounting positions and the conveyor path defines a translation range for the dolly carrier to ensure when an engine is secured to the carrier as a combination that combination has a centre of gravity between the spacing between the mounting positions.

Typically, the conveyor path comprises a rail or rails. Additionally, the conveyor path includes rollers to facilitate movement by the dolly carrier along the conveyor path. Possibly, the dolly carrier is captured on the conveyor path. Typically, the dolly carrier comprises a cage to engage and retain an engine core.

Possibly, the suspender members are arranged to hang vertically towards the platform from cross beams secured in use to a pylon. Generally, the suspender members are adjustable for altering platform and therefore conveyor path position relative to an engine in use. Possibly, the platform has couplings to secure the arrangement to an engine in use by alignment with the conveyor path.

Possibly, the conveyor path and/or dolly carrier can be driven on the conveyor path. Possibly, the conveyor path and/or dolly carrier can be driven by a driven screw thread or hydraulic piston relative to each other.

Possibly, the conveyor path and/or dolly carrier have a lock to secure relative location to each other.

Possibly, weights can be added to the platform in order to alter the centre of gravity of the combination of an engine in use secured upon a platform.

Typically, the suspender members have an adjustable length in order to allow the platform to be lowered or lifted as required in order to remove the engine.

Typically, the platform includes means for movement or anchoring in a transport container.

Also in accordance with aspects of the present invention there is provided a method of removing an engine core from a gas turbine engine, the method comprising exposing an engine core by removal of external panels, the method characterised by attaching an engine core stand arrangement as described above by securing the suspender members to a pylon upon which the engine is mounted, associating the engine with the platform using the dolly carrier, moving the dolly carrier along the conveyor path and lowering the dolly carrier with the engine for appropriate transportation.

Further in accordance with the present invention there is provided an engine stand for a gas turbine engine, the stand comprising a platform, the stand characterised by defining a conveyor path upon which a dolly carrier is secured by a lock, the dolly carrier including mountings for association with an engine in use and the lock ensuring retention of carrier position relative to the platform upon the conveyor path.

Embodiments of the present invention will now be described by way of example only and with reference to the accompanying drawings in which.

As indicated above, ready and convenient transportation of gas turbine engines is desirable. In such circumstances, provision of a gas turbine engine stand arrangement which allows removal of an engine core from the gas turbine engine and also facilitates transportation would be advantageous.

Clearly, removal of the engine core will require specialist ground support equipment. This ground support equipment should conveniently be of a minimised size and weight to allow easy transportation.

In accordance with aspects of the present invention, a gas turbine engine's existing pylon is utilised to enable removal of the core and a boot strap type arrangement utilised in order to facilitate lifting of the engine either out of engagement with the fan or into engagement with the fan unit of a gas turbine engine as required. As will be described later, essentially a platform is provided which is suspended by suspender members, that is to say boot straps secured to the engine platform. The platform includes a dolly carrier to support and engage with the engine core and associated with a conveyor path to allow initially substantially axial movement of the engine core for removal from association with the fan unit of the engine. Once axially moved the platform as well as associated engine can be lowered to a ground level upon removal from the engine or lifted into appropriate position when a replacement engine core is to be associated with the fan unit. The platform also provides a transportation jig for the engine core when the carrier dolly is locked in position upon the platform.

In terms of ground support equipment it will be understood that all that is required is the boot strap type suspender members which are generally associated through cross beams with the engine pylon to allow removal and chocks for the fan module assembly. In accordance with aspects of the present invention, an engine core can then therefore be removed and transported with less equipment by utilising the existing pylon within the engine mounting on wing.

In order to maintain stability it will be appreciated that the centre of gravity of the combination of the engine core and platform must be controlled and in such circumstances the carrier dolly will generally comprise a frame having spaced mountings to provide the engine with topple stability and also within the confines of the conveyor path on the platform limited lateral displacement distance or translation range for the engine. Thus, the suspender member locations upon the pylon as well as the centre of gravity are controlled to ensure stability as the engine is removed. The spacing of the mountings of the carrier dolly will therefore define the safe positions for the centre of gravity for the engine core/platform combination on removal and/or installation.

Figure 1:
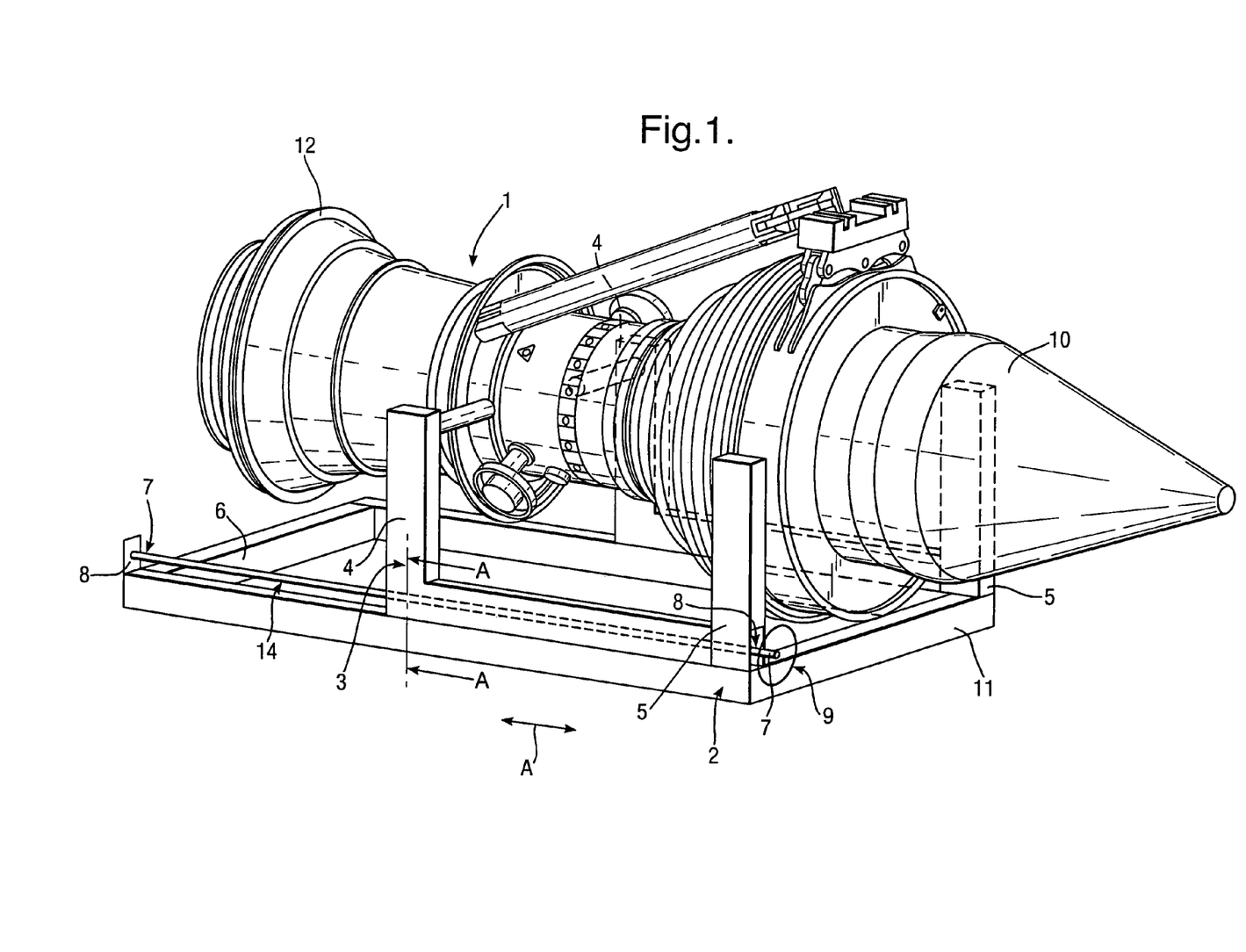
FIG. 1 is a schematic front perspective view of an engine core stand arrangement in accordance with aspects of the present invention associated with an engine core.

FIG. 1 illustrates an engine core 1 secured upon a platform 2 in accordance with aspects of the present invention. The core 1 takes a conventional form and as will be understood can be associated with a gas turbine engine with compressor fan stages and other parts to constitute a gas turbine engine.

The platform 2 incorporates a carriage or carrier dolly 3 having upstanding mounting members 4, 5 upon which the core 1 is secured and mounted. The carriage dolly 3 is moveable in the direction of arrowheads A along a conveyor path typically defined by rails or other mechanisms. It will be appreciated in FIG. 1 the carriage dolly 3 is at one extremity and therefore can be slid or otherwise moved to the other end 6 of the platform 2. Generally, bearings 7 are provided along which the dolly carriage 3 can move and end stops 8 are created to prevent further movement of the carriage dolly relative to the platform. Clearly, movement of the carriage dolly is required and advantageously this will be achieved by providing means for driving such movement such as a hand wheel 9 enabling a screw thread drive association between the carriage dolly and the conveyor path to be driven. It will be noted that generally the engine core is held upon the mountings 4, 5 of the carriage dolly such that alternatively at each extremity of location for that dolly 3, upon the platform an end part of the core 1 extends beyond the platform. In such circumstances in the configuration depicted in FIG. 1 an exhaust cone 10 extends beyond an end 11 of the platform 2 whilst at the other extremity, that is to say with the carriage dolly 3 substantially adjacent to the end 6 of the platform 2, an inlet end 12 of the engine core 1 will extend beyond that platform 2. In such circumstances, it will be understood that balance is important with regard to the combination of the platform 2 and the core 1 and therefore the mountings 4, 5 and their spacing will be chosen such that stability is provided and the centre of gravity retained between the spacing between the mountings 4, 5.

In use the platform 2 will be associated with suspender members typically in the form of boot straps which extend down from mountings associated with a pylon to support the engine in use. It will be appreciated that these boot straps and associated crossbars generally provide appropriate presentation of the suspender members for stable manipulation of the core 1 but are of limited weight and size and therefore will be convenient to use as will be described later.

Figure 2:
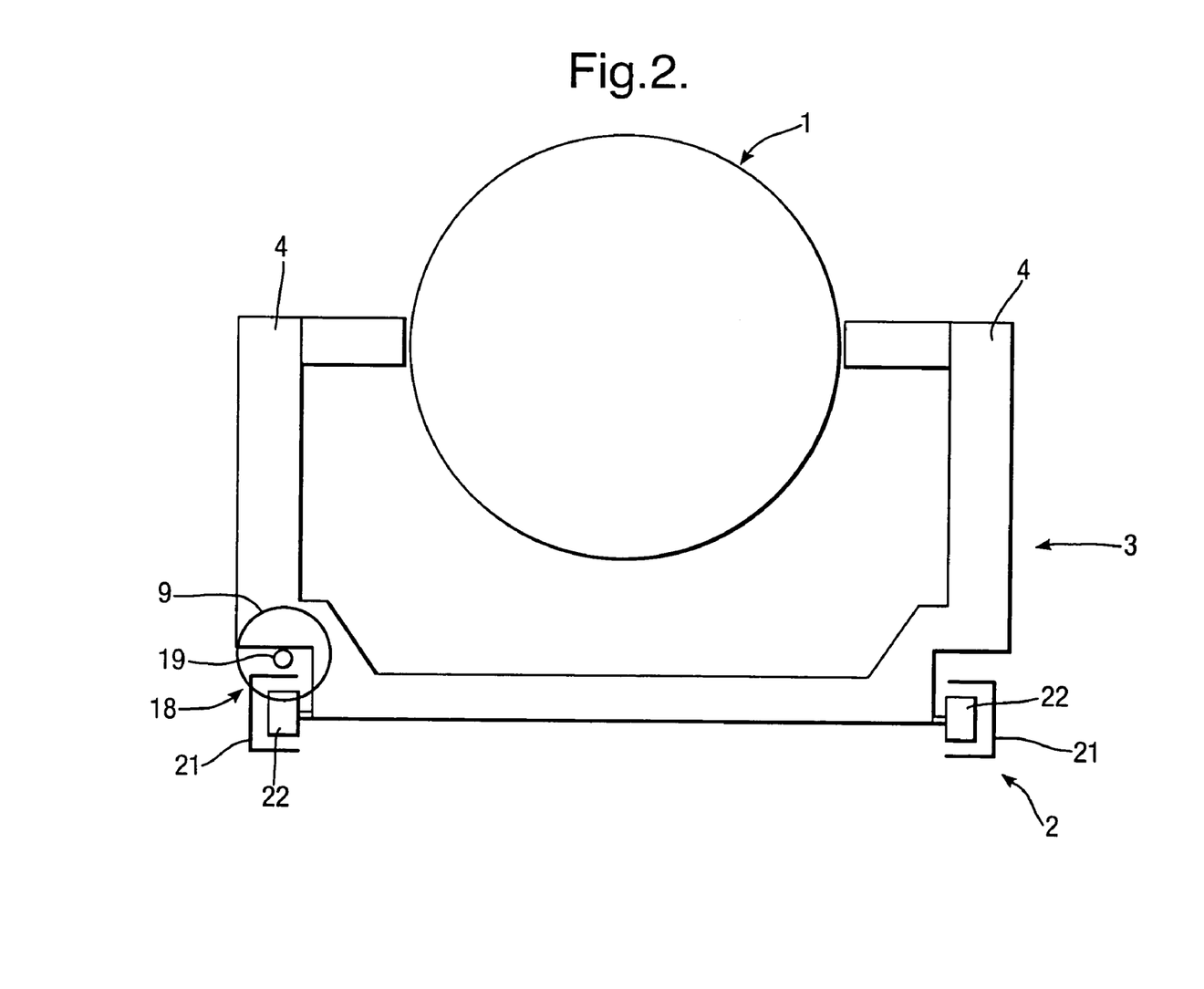
FIG. 2 is a schematic end cross section of an engine stand arrangement in accordance with aspects of the present invention associated with an engine.

FIG. 2 provides a schematic end cross section of the stand arrangement depicted in FIG. 1. Thus, similar reference nomenclature has been used for comparison. The engine core 1 is again supported by mountings 4 which engage appropriate parts of the core 1. The platform 2 incorporates rails 21 within which rollers 22 act to enable the carrier dolly 3 to be moved along the platform 2. As previously, the carrier dolly 3 is driven by a screw thread using a turn wheel 9 to drive the platform along the screw thread 19 and conveyor path. In such circumstances, the dolly 3 can be moved fore and aft as required for adjusting engine position. This means of driving dolly 3 movement could also be used to provide locking of dolly 3 position on the platform for transportation purposes. In such circumstances the screw thread and pins or latches in combination 18 will retain and lock relative position between the platform 2 and dolly 3 along with associated engine 1. Alternative mechanisms and locking devices may be used to retain relative position for transportation. It will also be understood that a motorised screw thread or other technique such as displaceable piston mechanism may be utilised for moving the transport dolly in use.

Figure 3:
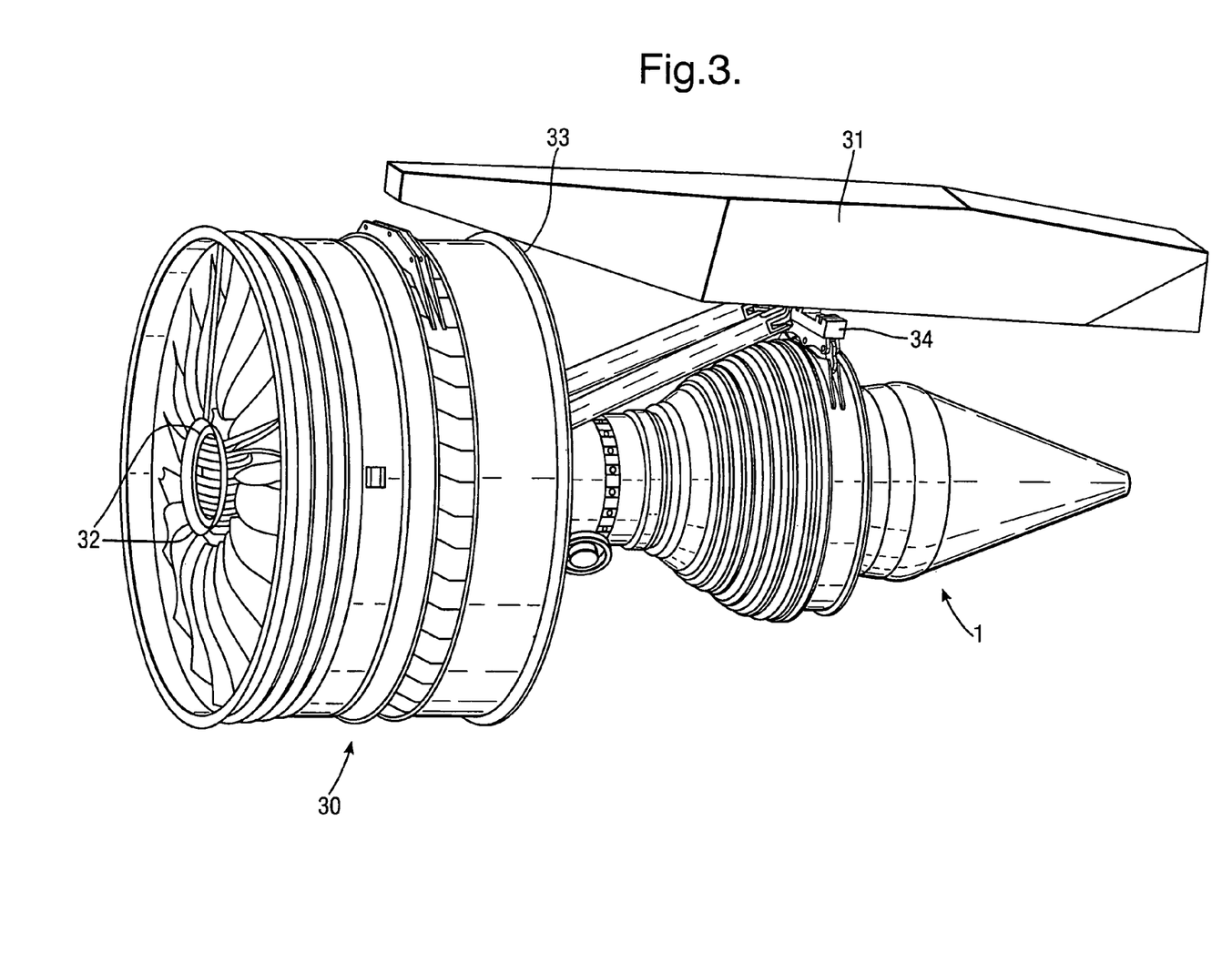
FIG. 3 is a front side perspective view of an engine core associated with a fan unit and a pylon just prior to removal in accordance with a method of the present invention.

FIG. 3 illustrates an engine in accordance with aspects of the present invention just prior to removal of the engine core 1 from a fan assembly 30. As can be seen, both the engine core 1 and the fan assembly 30 are mounted upon a pylon 31. A collar or other form of ground support equipment 32 is provided to support the fan module assembly 30 during an engine core 1 change. Furthermore, additional stiffening 33 is provided to support the association between the engine rear fan case and pylon 31 floor to again stabilise the module or assembly 30 during an engine core change. It will be noted that the intake remains attached to the fan case of the engine. Other mountings are retained to hold the fan case and core in place at this stage and a front fan case engine mount is not disconnected, the fan case to pylon disconnects are not broken but the outer panels and casings of the engine are removed to allow access. In such circumstances, the engine core 1 is secured to the pylon 31 through an appropriate mounting 34 and the arrangement depicted in FIG. 3 is ready for removal of the core 1.

FIG. 3 illustrates a second stage with regard to removal of the engine core 1 from the fan assembly 30. Thus, the fan disc curvic coupling and bolts at the base of the structural fan outlet guide vanes are removed to allow core withdrawal. Engine fan assembly 30 to engine core 1 systems and couplings are removed and all electrical connections etc., removed to allow detachment of the engine core 1 from the fan assembly 30.

Figure 5:
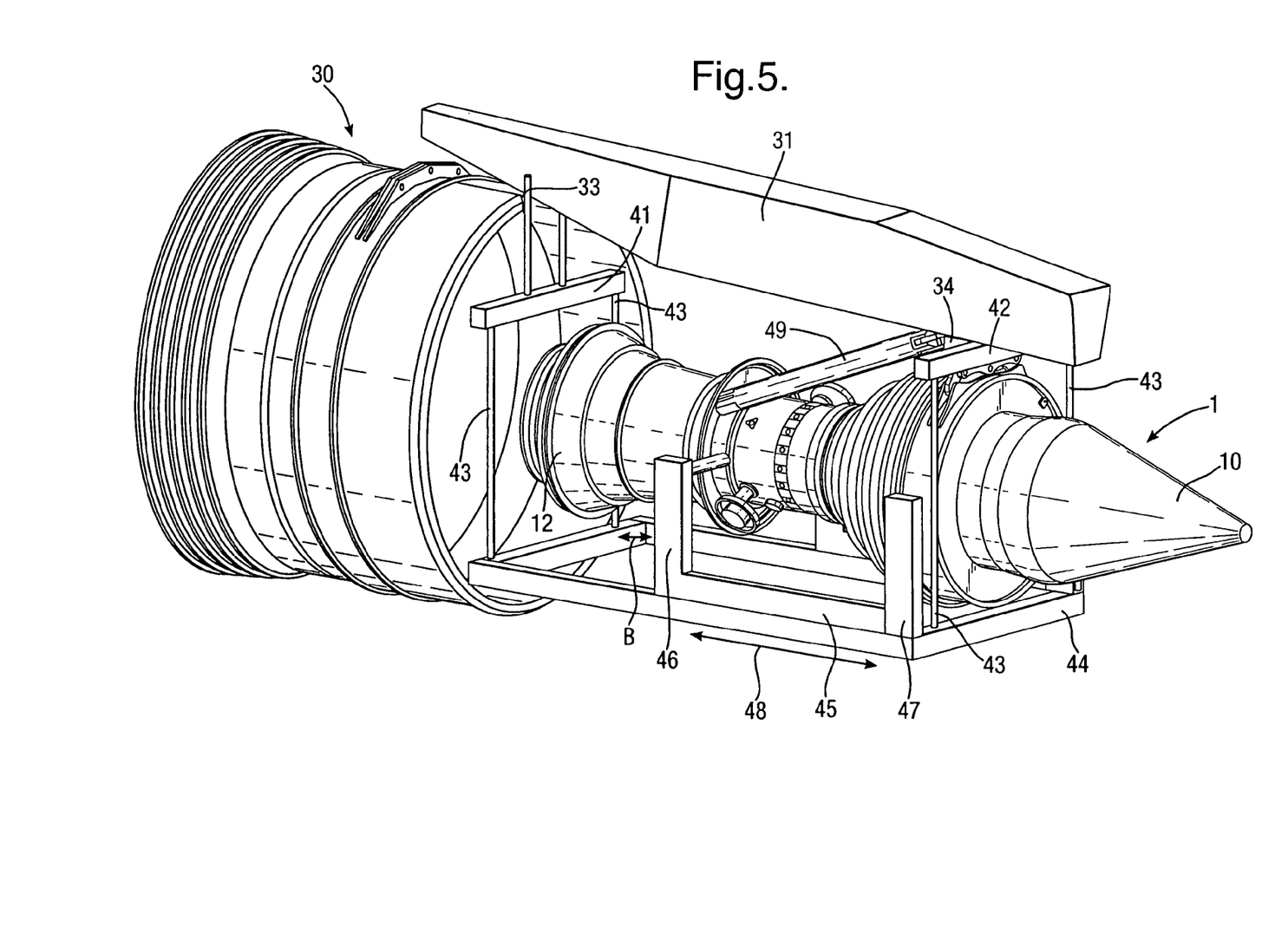
FIG. 5 is a part rear perspective view of an engine core upon an engine stand arrangement in accordance with aspects of the present invention upon initial withdrawal of the engine core in accordance with a method of the present invention.

In the above situation suspender arms 41, 42 are secured to the pylon 31 with suspender members 43 hanging substantially vertically down to a platform 44 upon which a carriage dolly 45 is presented. Such arrangement of the suspender members 43 ensure these members do not foul the core 1 and provides for stable presentation of the platform 44. Thus, the carriage dolly 45 includes mounting members 46, 47 with which the engine core 1 can be associated. Thus, the engine core 1 is ready for dissociation from the fan assembly 30. The platform 44 through the carriage dolly 45 generally supports the core 1, although, as will be seen, coupling by mounting 34 and other couplings 49 are also retained at this stage.

It will be understood at least the suspender members in the form of boot straps 43 will be individually adjustable to align the platform 44 with an engine axis for easy core 1 removal and withdrawal in view of roll, nose up and toe in core 1 installation attitudes or separate adjustment features could be built into the transportation stand.

Figure 4:
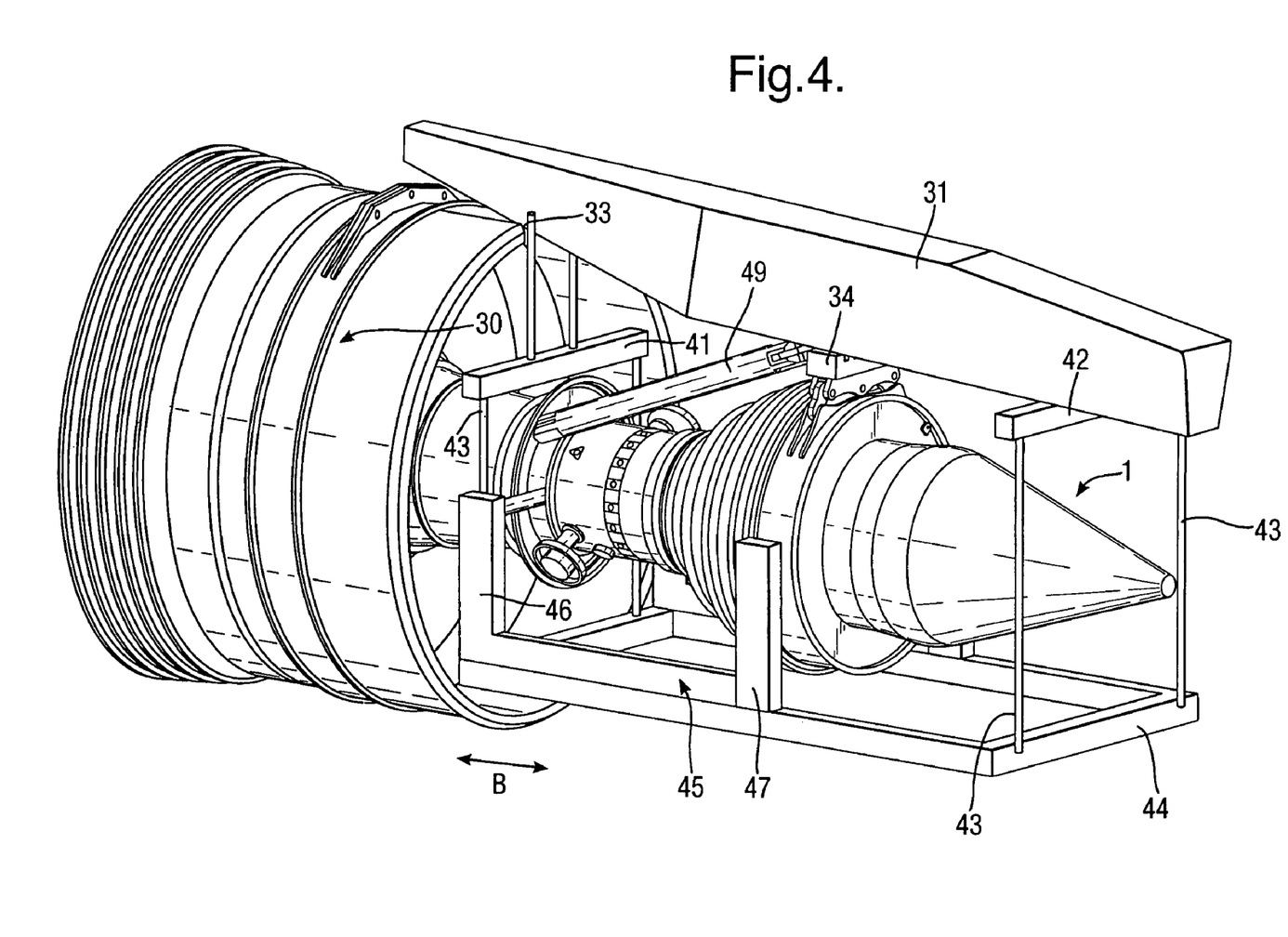
FIG. 4 is a slight rear perspective view of an engine core with engine core stand arrangement in accordance with aspects of the present invention upon initial core removal.

Referring to FIG. 4, in order to remove the core 1 it will be understood the mountings and couplings 34, 49 will be respectively released from the pylon 31 so that the weight of the core 1 is taken by the suspender members 43 through the arms 41, 42 in association with the pylon 31. In such circumstances, the carriage dolly 45 is able to move in the direction of arrowheads B to disengage a front inlet end of the core 1 from association with the fan assembly 30. Thus the dolly 45 traverses from one end of the platform 44 to the other over a translation range dictated by a conveyor path within that platform 44. As indicated previously, this will generally take the form of a rail with rollers such that the dolly carriage 44 is captively retained. Furthermore, movement of the transporting carriage 45 may be such that it is driven by a screw thread and head wheel or motor.

To aid alignment and to prevent sway during the initial translation it may be desirable to temporarily latch the platform line 44 to the engine casing 30. This fixture could then be moved once core withdrawal is complete.

It will be appreciated that as the carriage 45 translates and moves along the platform 44 care must be taken to ensure that the engine core remains stable. In such circumstances it will be understood that the arms 41, 42 and associated suspender members 43 provide a robust cage or stand for the engine core anchored upon the pylon 31 which in turn is secured to an air craft. In such circumstances in a first situation as depicted in FIG. 4 the front end 12 of the core 1 extends beyond the platform 44 whilst in the alternative extreme an exhaust cone part 10 extends beyond the platform 44. In either situation, as indicated, the arrangement must be stable so that the centre of gravity for the combination of the core 1 and the carriage 45/platform 44 should remain within the mounting spacing 48 between the boot straps beams 41, 42.

Figure 6:
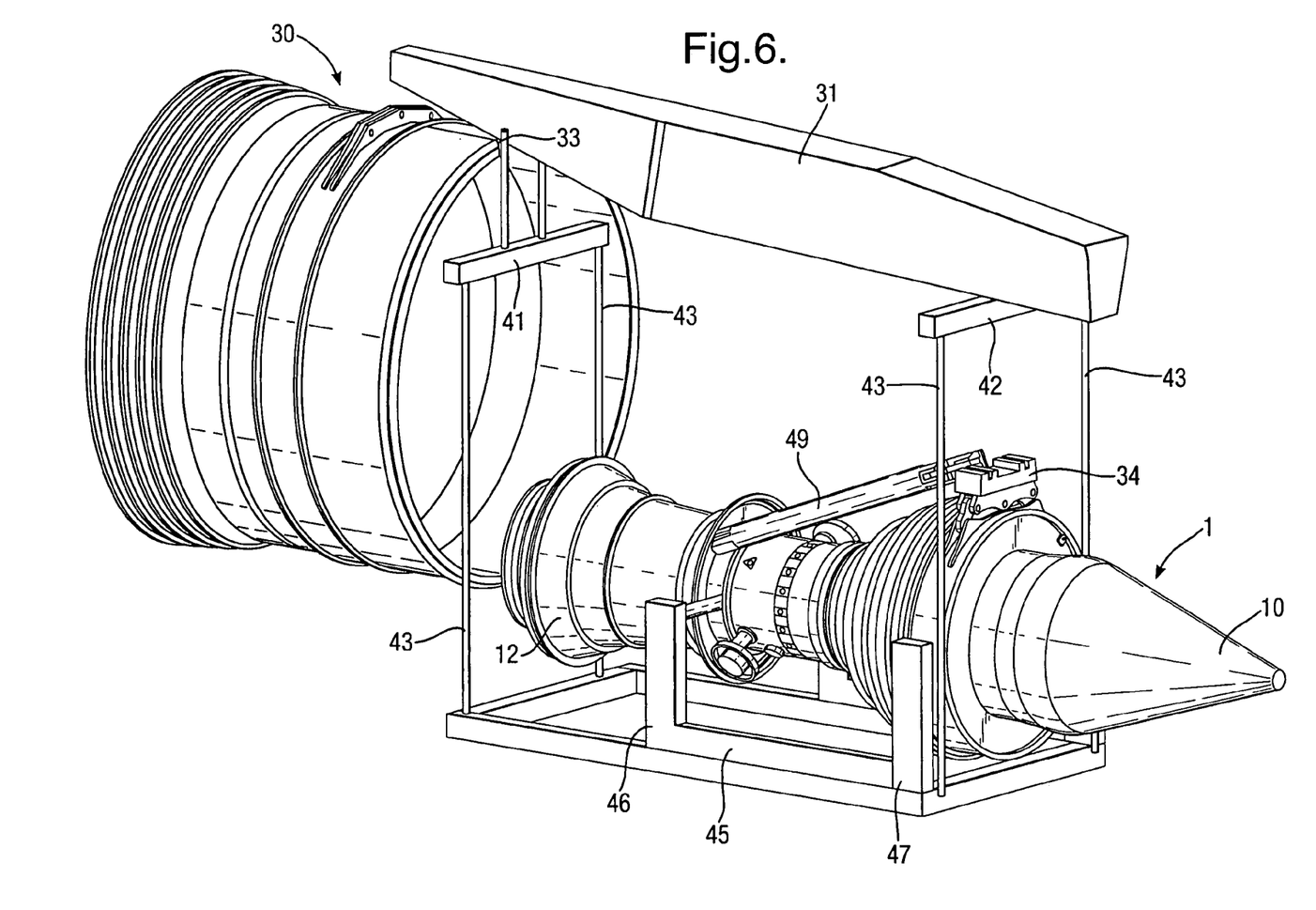
FIG. 6 is a slight rear perspective view of the engine core on the stand arrangement in accordance with aspects of the present invention lowered to ground level.

Once the core 1 has been removed from the fan assembly 30 it will be lowered to the ground. FIG. 6 illustrates the lowering process. It will be understood that this lowering is achieved principally through extension of the suspender members 43 until the platform 44 engages with the ground or transport pallet. In such circumstances the front mount and fan case systems remain in place as well as the intake fan, fan cowl doors and thrust reverser can be retained although not shown on the drawing for clarity.

With the core 1 and stand comprising the platform 44 and carriage 45 on the ground it will be appreciated it is ready for transportation. The position of the core 41 on the platform 44 may be adjusted such that the carriage is more centrally located between the extremities of the conveyor path and locked in position. The suspender members 43 and arms 41 and 42 may be removed. The platform 44 will normally include anchors (not shown) to allow it to be secured to or within a transport container.

As indicated above, it is important that through the removal process the stand and core in association with other parts such as the pylon 31, remain stable. Part of that procedure is to ensure that the centre of gravity of the combination of the core 1 and platform 44/carriage 45 remains within the spacing between the suspender members 41 and 42 either side of the core 1. If this may prove difficult, then it will be understood that proportionate weights may be applied to parts of the platform to adjust the centre of gravity of the combination and therefore maintain stability relative to the mountings on the pylon 31 until at ground level when, as indicated, the carriage 41 position to the platform may be adjusted through movement along the conveyor path. Clearly, care must be taken that the additional weight does not over-stress the pylon or other parts of the engine/wing mountings.

Figure 7:
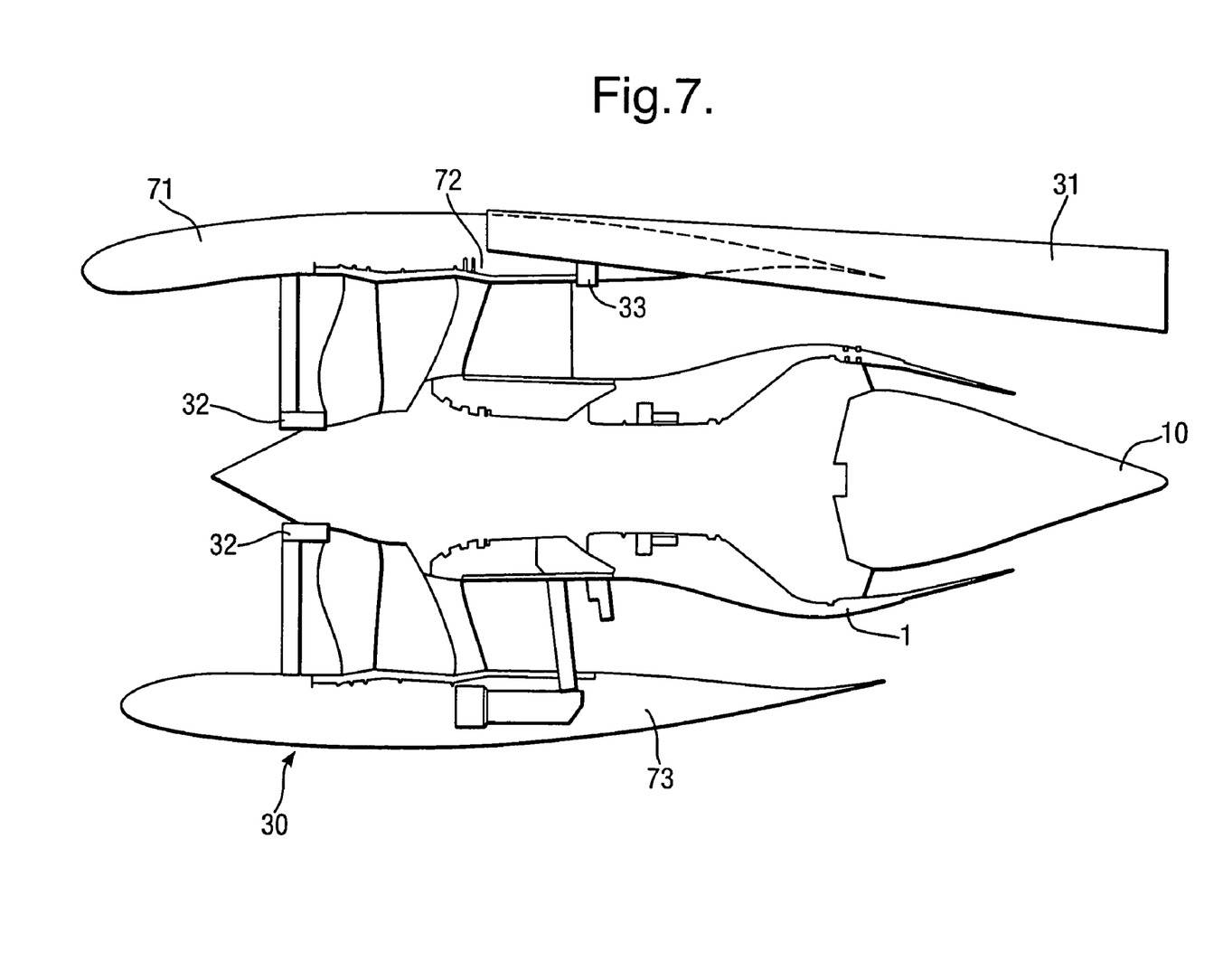
FIG. 7 is a schematic side view of an engine core just prior to removal of the engine core in accordance with aspects of the present invention.

FIG. 7 provides a side cross section of an engine prior to removal of the engine core in accordance with aspects of the present invention. Similar reference nomenclature has been used to previous drawings for comparison and clarity. Thus, the fan assembly 30 has retained its intake 71 attached to a fan case. In order to support the fan assembly module 30, that is to say fan blades during removal of the engine core 1, ground support equipment 32 in the form of chocks are located between the blade assemblies and the fan casing 71. Whilst these chocks 32 are inserted a further mounting support or stiffener 33 is provided to support the fan case and intake whilst the core 1 is removed against side torque and thrust loads it will be understood that the remaining mountings 72 which secure the engine to the pylon 31 will be retained. Furthermore, other parts 73 will be adjusted for access but may remain attached and supported eventually by pylon 31 through appropriate mountings in the engine casing etc.

Figure 8:
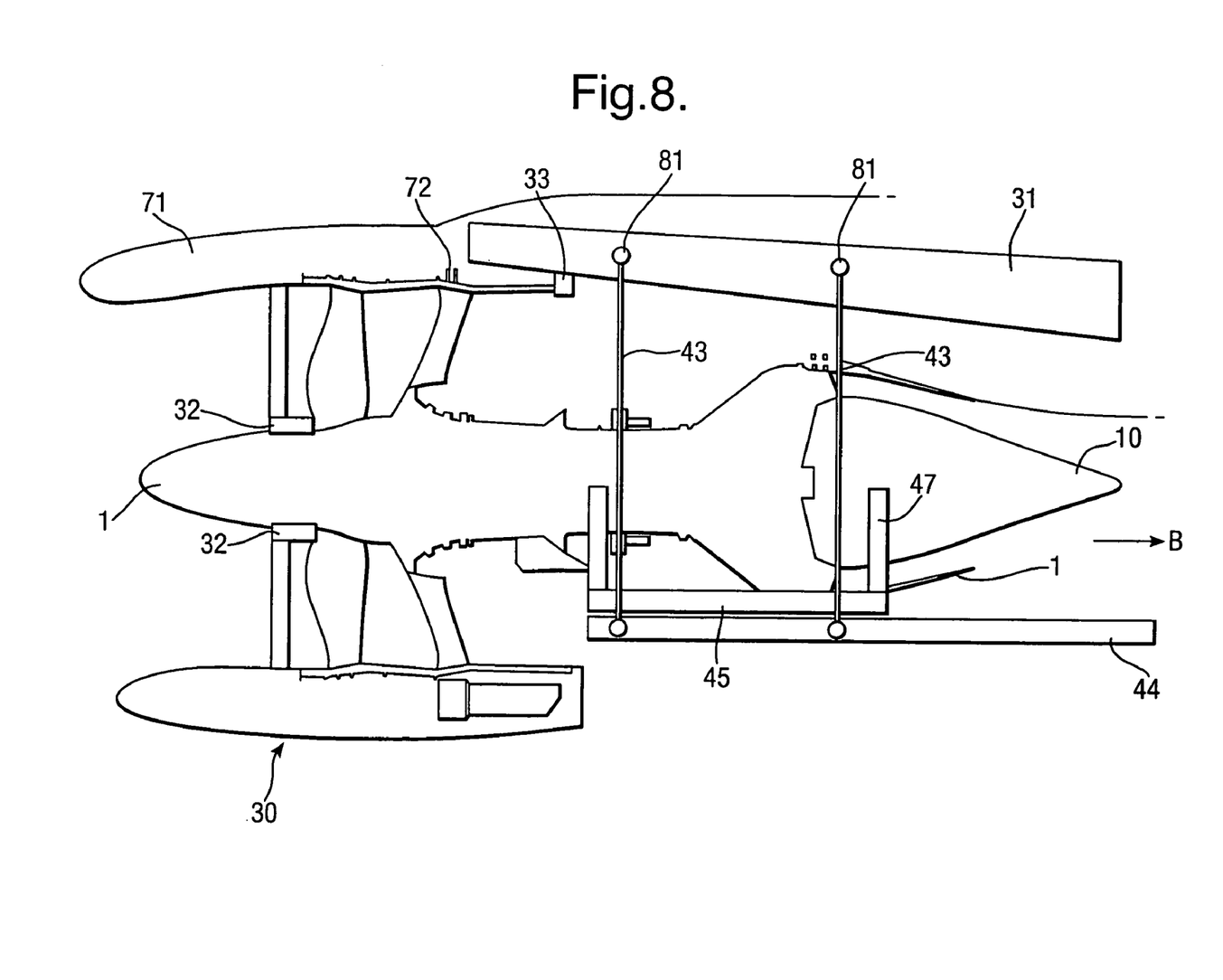
FIG. 8 is a schematic side view of the engine core with stand arrangement in accordance with aspects of the present invention just prior to engine core removal; and, FIG. 9 is a schematic view of the engine core removed from association with a fan assembly in accordance with aspects of the present invention.
Figure 9:
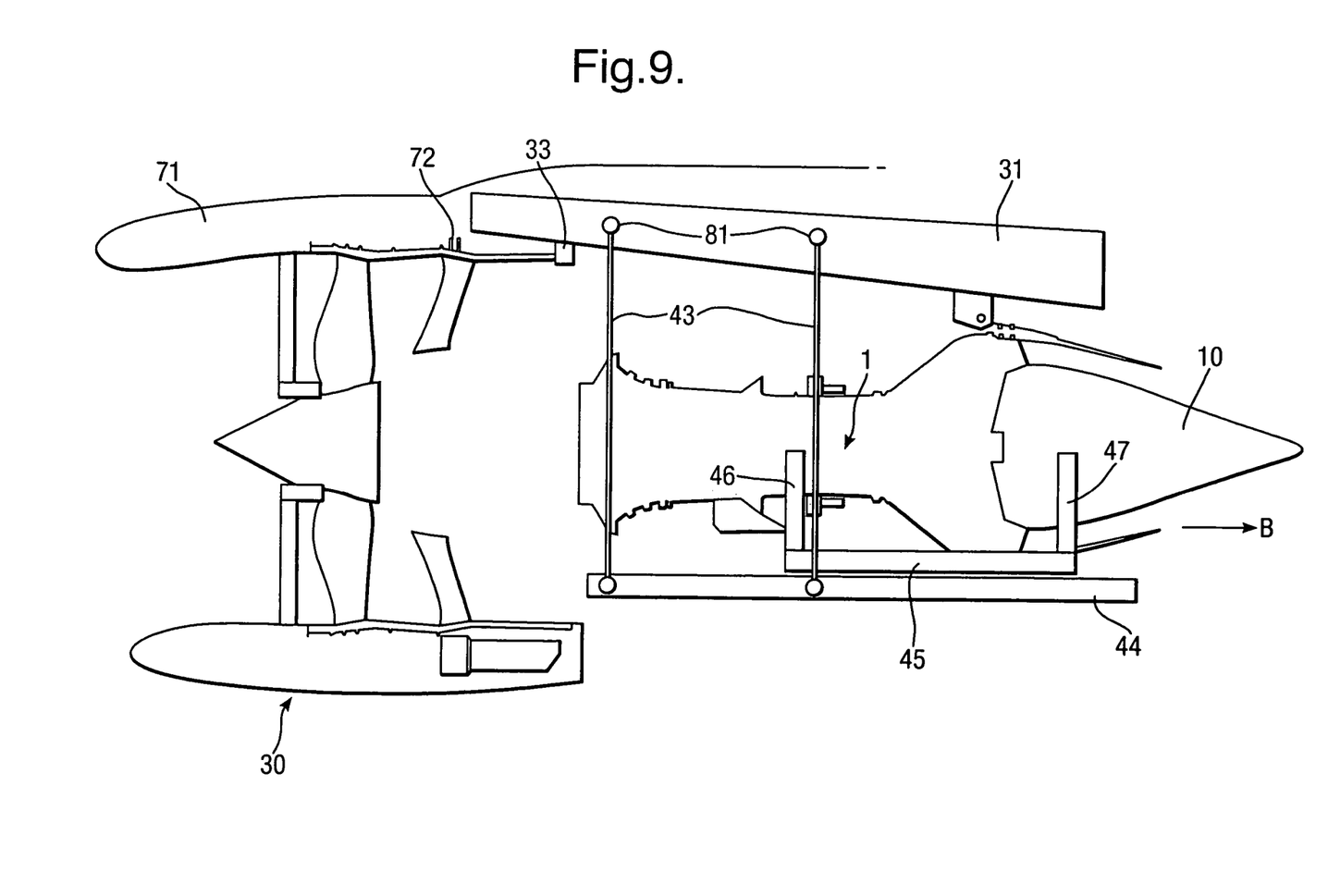

FIG. 8 illustrates a situation in side cross section of the engine core 1 prior to removal of an engine core 1. Thus, as can be seen, panels and other parts of the engine are removed to allow association of a platform 44 supported on suspender members 43 secured at a mounting end 81 to the pylon 71 and at an opposing end to the platform 44. Secured upon a platform 44 is a carrier dolly 45 with which the core 41 is associated. This association may be simply through weight but more normally will be through more robust mountings between the carrier 45 and the core 1. Once secured and all other couplings have been detached or removed as necessary, the dolly carrier 45 can be moved in the direction of arrowheads B to a position as depicted in FIG. 9. However, as indicated above, it will be understood before that stage the suspender members 34 will generally be adjusted to cause appropriate alignment between the core 1 and the carrier 45 to allow the core 1 to be moved aft of a wing upon which the pylon 31 is secured. This extraction of the core 1 from the fan assembly module 30 will generally require a precise axial displacement laterally away from the module 30. Adjustment of the suspender members 43 will ensure that the correct orientation of the conveyor path is achieved.

It will be understood as described previously that the dolly carriage 45 moves along a conveyor path typically formed by rails within the platform 44. These rails therefore defining a translation range for the carrier 45 upon which the core 1 can be moved for detachment from the fan assembly 30.

It will be noted that the centre of gravity for the core and the combination of the core with the platform 44/carriage 45 should remain within the mountings 41 and 42 of the carriage 45. In such circumstances during detachment the whole assembly will remain stable with the platform 44 secured and suspended through the suspender members 43 to the pylon 31. Generally, in order to facilitate removal of the core 1 from the fan assembly 30, it will be understood some manoeuvring will be required to clear certain features within the association therebetween. Thus, for example to may be necessary to initially pull the core substantially rearwards for a certain distance along the main axis of the association between the fan assembly 30 and the core 1 and then lower the core 1 a certain distance before fully translating the core 1 upon the carriage 45 along the rails of the platform 44. In such circumstances, it will be understood that clashing between the core 1 and rear parts of the pylon mountings may be avoided. This adjustment may be achieved through lowering or lifting the suspender members 34 as required, that is to say extending or shortening them.

The core when withdrawn from the fan assembly 30 provides greater access for in-situ repairs to be performed on the engine core but more normally an engine core will be lowered to ground level and transported away upon the platform and carriage dolly as described above for repairs etc.

It will be appreciated that assembly of a replacement core upon a fan assembly in accordance with aspects of the present invention will be a substantial reversal of the method as described above. Thus, the platform and carriage as a transport stand for the engine core will be transported as required to an appropriate aircraft location for assembly.

In the above circumstances, aspects of the present invention provide an engine core stand arrangement to allow transportation and removal of a core from a gas turbine engine. Rather than a necessity of providing a large gantry, it will be appreciated that the existing pylon of the engine is utilised with support members in the form of boot straps which extend down to a platform and then through appropriate careful translation of a carriage dolly the core can be removed from association with a fan assembly. The stand arrangement is used in accordance with a method whereby initially the fan case and other parts of the gas turbine engine are appropriately chocked and otherwise secured to ensure they remain supported and associated with the pylon when the engine core is removed. Once the fan casing and other parts of the gas turbine engine are appropriately secured, panels are removed to allow the platform, carriage and suspender members access to the engine core. Mounting ends of the suspender members are associated with the pylon to provide a stable basis for removal of the engine core. Generally, it is necessary to adjust the suspender members to provide alignment of the engine core with the dolly carrier or other parts of the stand. Once this process is completed couplings between the engine core and the fan case and pylon are released and the engine core is then allowed to move with the carriage dolly across a conveyor path formed in the platform. The centre of gravity is retained between the suspender members to ensure stability. Once the engine core is sufficiently displaced from the fan case and other parts of the engine it is lowered to the ground. The suspender members can be removed.

Normally, a platform and carriage dolly will be substantially specific to a particular engine type and mountings with regard to the pylon association. However, it may be possible to use the same carriage platform and suspender members with different engine types with appropriate adjustment and particularly if the weight distribution within the platform can be adjusted to compensate for different weight distributions and sizes with respect to the engine core altering the position of the centre of gravity of that core to ensure that centre of gravity remains within the spacing between the suspender mountings of a stand.

One particular advantage of the present invention is that the suspender members can take the form of conventional boot straps. These boot straps may be cables which can be detached and easily transported along with a cross beams as described previously reducing transportation costs and complexity.

As will be appreciated, once the engine core is removed it is securely located upon the platform through robust locking of the carriage upon the platform. It will be understood that protective covers and boxing may also be used where required.

Modifications and alterations to the present invention will be understood by those skilled in the art. Thus, for example more than two suspender members may be utilised where required in order to potentially enhance stability and in such circumstances the centre of gravity consideration with regard to the combination of the engine core and the platform will then be retained between the extremities of the outside suspender members in order to maintain stability. As indicated, the platform will generally be held captive on rails to move from one end of the platform to the other in order to facilitate removal of the engine core from the engine on the aircraft wing.

In summary, the present invention is a frame for removing the engine core 1, or a part thereof, of a gas turbine engine which is attached to the pylon or other airframe suspension system. The frame comprises a platform 2, 44 with a conveyor path for a dolly carrier 3, 45 to carry an engine core 1 (or part thereof) in use and suspender members 43 for securing the platform to an engine pylon 31. The arrangement is characterised by the suspender members 43 having spaced mounting 4, 5 positions and the conveyor path defines a translation range for the dolly carrier to ensure when an engine is secured to the carrier as a combination; that combination has a centre of gravity between a spacing 48 between the mounting positions. Advantageously, the core engine, or a part such as a compressor stage, may be removed from the engine while the remainder of the engine is still connected to the aircraft. This allows much faster maintenance times that current practise of removing the entire engine.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An engine core removal frame arrangement for a gas turbine engine, the arrangement comprising a dolly carrier to carry an engine core in use, a platform with a conveyor path for the dolly carrier and suspender members for securing the platform to an engine pylon in use, wherein the suspender members have spaced mounting positions and the conveyor path defines a translation range for the dolly carrier to ensure that, when an engine is secured to the carrier as a combination, the combination has a centre of gravity between a spacing between the mounting positions.

2. An arrangement as claimed in claim 1 wherein the conveyor path comprises a rail or rails.

3. An arrangement as claimed in claim 1 wherein the conveyor path includes rollers to facilitate movement by the dolly carrier along the conveyor path.

4. An arrangement as claimed in claim 1 wherein the dolly carrier is captured on the conveyor path.

5. An arrangement as claimed in claim 1 wherein the dolly carrier comprises a cage to engage and retain the engine core in use.

6. An arrangement as claimed in claim 1 wherein the suspender members are arranged to hang vertically towards the platform from cross beams secured in use to the pylon.

7. An arrangement as claimed in claim 1 wherein the suspender members are adjustable or altering platform and therefore conveyor path position relative to an engine in use.

8. An arrangement as claimed in claim 1 wherein the platform has couplings to secure the arrangement to the engine in use by alignment with the conveyor path.

9. An arrangement as claimed in claim 1 wherein the dolly carrier can be driven on the conveyor path.

10. An arrangement as claimed in claim 9 wherein the dolly carrier can be driven by a driven screw thread or a hydraulic piston.

11. An arrangement as claimed in claim 1 wherein the conveyor path and/or the dolly carrier have a lock to secure relative location to each other.

12. An arrangement as claimed in claim wherein 1 weights can be added to the platform in order to alter the centre of gravity of the combination of the engine in use secured upon the platform.

13. An arrangement as claimed in claim 1 wherein the suspender members have an adjustable length in order to allow the platform to be lowered or lifted as required in order to remove the engine.

14. An arrangement as claimed in claim 1 wherein the platform includes means for movement or anchoring in a transport container.

15. A method of removing an engine core from a gas turbine engine, the method comprising exposing an engine core by removal of external panels, attaching an engine core stand arrangement as claimed in claim 1 by securing the suspender members to a pylon upon which the engine is mounted, associating the engine with the platform using the dolly carrier, moving the dolly carrier along the conveyor path and lowering the dolly carrier with the engine for appropriate transportation.

16. An engine stand for a gas turbine engine, the stand comprising a platform, the stand defining a conveyor path upon which a dolly carrier is secured by a lock, the dolly carrier including mountings for association with an engine core in use and the lock ensuring retention of carrier position relative to the platform upon the conveyor path.

* * * * *